Oct. 25, 1949.                H. L. KINDORF                2,485,891
                               CABLE CLAMP
                          Filed March 8, 1946.
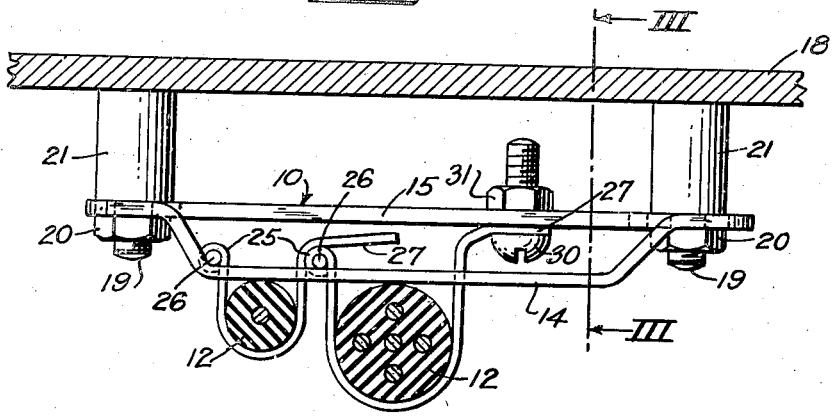
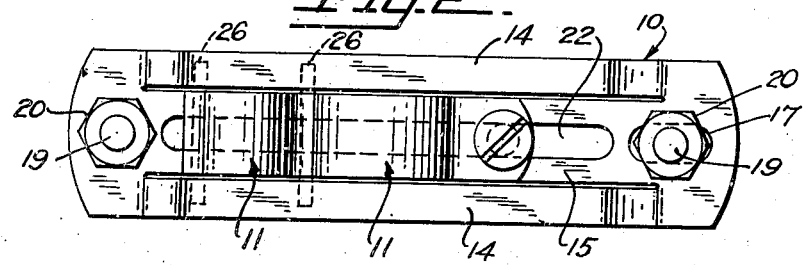
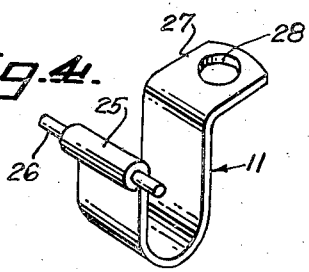
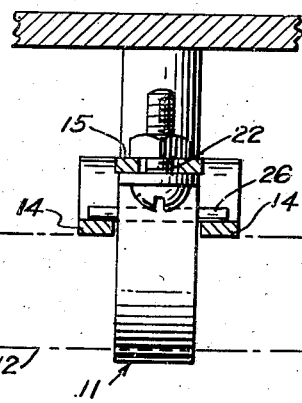
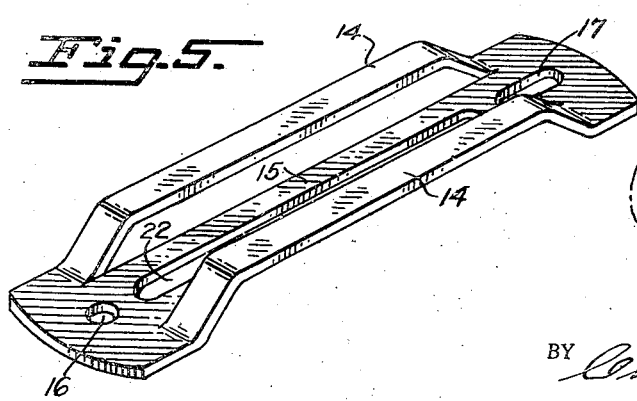
INVENTOR.
HARRY L. KINDORF
BY
ATTORNEY Patented Oct. 25, 1949

2,485,891

UNITED STATES PATENT OFFICE 2,485,891

CABLE CLAMP

Harry L. Kindorf, San Francisco, Calif.

Application March 8, 1946, Serial No. 653,010

3 Claims. (Cl. 248—68)

This invention relates to cable clamps of the kind employed for securing cables or conduits in a position parallel to a wall or ceiling along which they are led.

Easily applied inexpensive fixtures are desirable for supporting cables or the like and one such fixture is the kind shown in my Patent No. 2,394,518 issued February 5, 1946, for Universal multiple cable clamp wherein the need for such clamps and their function is clearly set forth.

It is an object of the present invention to provide an improved cable clamp which is simple and inexpensive in construction and which is easily assembled and provides an unusually secure fastening for a plurality of cables or conduits even though they may be of different sizes. Further objects and advantages of the invention are made apparent in the following specification wherein reference is made to the accompanying drawings.

In the drawings:

Fig. 1 is a view in side elevation of a cable clamp embodying the present invention shown secured to a ceiling or deckhead and with two cables in place;

Fig. 2 is a bottom plan view of the cable clamp shown in Fig. 1 with the cables removed;

Fig. 3 is a sectional view taken on the line 3—3 of Fig. 1;

Fig. 4 is an isometric view of a binding member which is a part of the clamp; and Fig. 5 is an isometric view of the base portion of the clamp.

The clamp as shown in the drawings is made up of a base member generally indicated at 10 and illustrated in Fig. 5, and binding members shown at 11, one of which is illustrated in Fig. 4. The binding members 11 are employed to secure cables such as indicated at 12 and 13 in Fig. 1 against the base member.

The base member 10 is made of a flat metal plate which is cut and deformed to provide a pair of parallel bars 14 which are spaced from each other and which are spaced from the main central portion 15 of the base member. Perforations 16 and 17 are provided at opposite ends of the base member for securing it in place preferably in spaced relation to the wall or ceiling against which it is to be used. In Fig. 1, for example, the base member is shown as supported with relation to a deckhead plate 18 by means of shoulder studs 19 and nuts 20. The studs 19 may be welded or secured in any other suitable manner to the plate 18 and have enlarged portions disposed between the plate 18 and the base member for providing the desired spacing. The perforation 17 in the base member is shown as elongated so that precise spacing of the studs against the plate is not essential. Instead of employing the studs 19, the base member may be welded directly to the plate and if desired the spacers 21 may be eliminated altogether by making the base member slightly longer and bending its ends toward the plate to provide spacing legs. An elongated slot 22 is provided in the base member parallel to and centrally disposed with relation to the bars 14.

The length of the base member herein shown is suitable for securing three or four cables of average size but its length may be increased to accommodate any desired number of cables. The binding members 11 are similar in construction and application to similar binding members shown in my Patent No. 2,394,518 hereinabove referred to. Each binding member comprises a flat strip of metal as illustrated in Fig. 4 which is formed to a substantially U shape, the size of its U shape portion being such that it will accommodate a cable in the manner illustrated in Fig. 1, and binding members of different sizes are provided for various standard sizes of cables. One end of the strip is bent as indicated at 25 around a transversely disposed pin 26 and the opposite end is bent outwardly to form a hook like part 27 which in the present invention is provided with a perforation 28. The width of the principal portion of the binding member is slightly less than the space between the bars 14 and the transversely extending pin 26 is of greater length than the space between these bars so that its laterally projecting ends will rest on the bars.

In assembling the parts herein described to secure cables, the required size and number of binding members are suspended from the bars 14 by means of the pins 26 on the binding members which are disposed behind the bars. With the cables in place within the U shape portion of the binding members they are then swung upwardly and urged toward one side of the base member so that the pin 26 of each but the first binding member underlies hook part 27 of the next binding member to retain it in a position where the cable is securely clamped against the bars 14. The hook part 27 may then be bent around the pin 26 and portion 25 of the adjacent binding member which supports it but in most cases this is unnecessary as the metal of which the binding member is formed is sufficiently strong to support the weight of the cable without this further bending. In Fig. 1 only two cables are shown but it is apparent that any number of cables may be supported in this manner with the binding member of each cooperating in the support of the adjacent binding members. When the last cable is in place as represented by the cable shown at the right in Fig. 1, the hook part of its binding member is held behind the bars 14 by a bolt 30 which projects through the perforation 28 in the hook part 27 and which also projects through the slot 22 in the base member and is held in place by a nut shown at 31 disposed behind the base member. This means of securing the last binding member in place is novel and considerably simpler and less costly than means heretofore used for similar purposes and is made possible by the particular construction of the base member herein shown which is in itself extremely simple, light in weight and inexpensive. Because of the construction of the base member, the head of the bolt 30, which is preferably provided with a screw driver slot as shown, is exposed for the convenient use of a screw driver which may be passed between the bars 14 and, because of the use of the shoulder studs with their spacing portions 21, the nut 31 is easily accessible so that it may be held while the bolt is manipulated with a screw driver. The spacing portions 21 serve also to space the base member a sufficient distance from the wall or ceiling with which it is used to permit cleaning and painting behind it after the cables are installed.

I claim:

1. A cable clamp of the character described comprising a base member formed of a flat metal plate having edge parts cut and deformed to provide a pair of parallel bars spaced from the plane of the plate but attached thereto only adjacent to their ends, and cable binding members cooperating with said bars to secure cables against them, said base member being slotted between said bars and said binding members having a perforation whereby they may be secured to the slotted base member by a bolt.

2. A cable clamp of the character described comprising a base member formed of a flat metal plate having edge parts cut away from the plate except at their ends and deformed to provide a pair of parallel bars spaced from the plane of the plate, and cable binding members cooperating with said bars to secure cables against them and means for securing the base member to a wall surface.

3. A cable clamp of the character described comprising a base member formed of a flat metal plate having edge parts cut and deformed to provide a pair of parallel bars spaced from the plane of the plate and connected with the plate through deformed portions of the metal, and cable binding members cooperating with said bars to secure cables against them, each of said cable binding members comprising a strap like member adapted to embrace a cable and having a laterally projecting part at one end to lie behind the bars and to engage said deformed portions to prevent longitudinal displacement and having a perforation formed in its opposite end for the reception of a securing means.

HARRY L. KINDORF.

REFERENCES CITED

The following references are of record in the file of this patent:

UNITED STATES PATENTS

| Number | Name | Date |
|---|---|---|
| 598,320 | Knapp | Feb. 1, 1898 |
| 2,375,513 | Bach | May 8, 1945 |
| 2,394,518 | Kindorf | Feb. 5, 1946 |